2,884,352

STABLE DISPERSIONS OF COLLOIDAL SULFUR, PROCESSES OF PREPARING SAME, AND SULFUR SOLUTIONS ADAPTED FOR USE IN PREPARING SUCH DISPERSIONS

Mortimer W. Brenner, Hartsdale, and Joseph L. Owades, New Rochelle, N.Y., assignors to Schwarz Laboratories, Inc., a corporation of New York No Drawing. Application March 21, 1955
Serial No. 495,829

16 Claims. (Cl. 167—20)

This invention relates to stable dispersions of colloidal sulfur, to processes of preparing the same and to sulfur solutions particularly adapted for use in making such stable dispersions of colloidal sulfur.

Elemental sulfur is a component of a large number of preparations designed for use in the control of diseases in plants, animals and man caused by certain micro-organisms. For example, powdered sulfur is dusted on plants, frequently in combination with other materials, to control growth of molds, smuts, and rusts which would otherwise attack plant tissue. Many salves and unguents used in veterinary practice to control diseases of the skin contain finely divided sulfur and, in general, medicinal and dermatological preparations containing sulfur are prescribed for such diseases as sebhorretic dermatitis, and to some extent, acne.

As the treatments utilizing topical application of sulfur generally involve surface phenomena, the efficacy of the sulfur is directly related to the fineness of particle size. It is therefore important to have the sulfur dispersed in colloidal form of minimum particle size, preferably below one micron in diameter. However, to the best of our knowledge and belief, prior to our invention, colloidal sulfur has not been prepared readily in sub-micron particle size and in a stable dispersion in vehicles which would be suitable for application to plant or animal tissue.

It has been proposed to dissolve sulfur in ethanol and add the resultant solution to water to form an aqueous dispersion of sulfur. However, since sulfur is sparingly soluble in ethanol only very dilute sulfur solutions in ethanol can be made with consequent usually non-useful low sulfur concentration of the resultant sulfur dispersion.

It is among the objects of the present invention to provide processes of preparing stable suspensions of colloidal sulfur in which the sulfur particles are extremely fine, i.e., having a particle size below one micron.

It is another object of this invention to provide such processes which result in dispersions having relatively high concentrations of sulfur, about 1% by weight and, if desired, as high as 5% by weight.

Another object of the present invention is to provide a process of preparing stable suspensions of colloidal sulfur in either water-based or oil-based vehicles.

Still another object of the invention is to provide stable suspensions of colloidal sulfur either as free-flowing fluids or as salves, ointments or creams, having in all forms stable particle size distribution in the sub-micron range and having, if desired, relatively high concentrations of colloidal sulfur, say as high as 4% to 5% sulfur.

Still another object of the invention is to provide stable suspensions of colloidal sulfur which are free of the odor of hydrogen sulfide and also free from ionic sulfur, and having a low toxicity to plant or animal tissue.

Still another object of the present invention is to provide solutions of elemental sulfur which are freely dispersible in water or aqueous solutions to form aqueous suspensions of colloidal sulfur as needed.

Still another object of the present invention is to provide solid solutions of elemental sulfur which when added to aqueous media result in stable sulfur dispersions.

Other objects and advantages of this invention will be apparent from the following detailed description thereof.

In accordance with this invention elemental sulfur which may be in the form of flowers of sulfur or sulfur in relatively pure form commercially available, is dissolved in a poly alcohol or ether or ester derivative thereof hereinafter set forth at a temperature within the range of 100° to 140° C.—preferably 110° to 130° C.—to form a solution containing a concentration of about 1% to 5% sulfur, and this solution while still warm, e.g., it may be cooled to about 80° C., added to an aqueous, fat or oil medium in which the sulfur is insoluble, but with which the sulfur solvent is miscible. Surprisingly, we have found that by following this procedure a stable dispersion of colloidal sulfur of desired concentration which may be as high as 3% or 4% by weight in the vehicle, which it is noted may be aqueous, fat or oil, results. The sulfur particles in this dispersion are of submicron size.

The poly alcohol solvent for the sulfur, in accordance with this invention, is an aliphatic poly alcohol containing from 2 to 1,000 carbon atoms, having at least two hydroxy groups, and in the case of an alcohol having 3 or more carbon atoms not more than three hydroxy groups, one of which is a free hydroxy group, which is freely water miscible and which may have one, or in the case of a trihydroxy alcohol, two of the hydroxy groups esterified by a fatty acid containing from 10 to 22 carbon atoms or may have one of the hydroxy groups etherified so that the ether radical is (1) an alkyl group containing 1 or 2 carbon atoms, (2) an alkyl hydroxy group containing 1 to 6 carbon atoms, or (3) an esterified alkyl hydroxy group in which the ester portion is derived from a fatty acid containing 10 to 22 carbon atoms and the alkyl group contains 1 to 6 carbon atoms, and in the case of a trihydroxy alcohol one of the hydroxy groups may be esterified with a fatty acid as above set forth and another hydroxy group may be etherified as above disclosed. Examples of such poly alcohol solvents are ethylene glycol, diethylene glycol, triethylene glycol, other polyethylene glycols having the formula

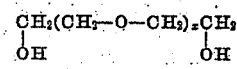

where $x$ is from 3 to 500, propylene glycol, dipropylene glycol, glycerol, glyceryl monostearate, glyceryl oleolaurate, glyceryl mono-oleate, polyoxyethylene sorbitan monolaureate, polyoxyethylene monostearate, 2-methoxy ethanol, ethoxy-triglycol, hexane diol-2,5, pentane diol-1,5 and methyl Carbitol (diethylene glycol monomethyl ether).

Polyethylene glycols having molecular weights from about 1,500 to 20,000 are preferred solvents for the production of solid sulfur solutions which can readily be dispersed in an aqueous medium. Particularly preferred are the polyethylene glycols sold under the trade name "Carbowax" which have a probable formula

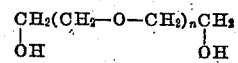

in which $n$ equals 90 to 500 and which have molecular weights of from 4,000 to 20,000. The use of these polyethylene solvents results in solid solutions of sulfur which may contain as much as 5% sulfur and which are readily dispersible in an aqueous medium or in fat or oil to produce a stable dispersion of colloidal sulfur of sub-micron size.

In the practice of the invention the stability of the colloidal sulfur particles may be enhanced by adding natural or synthetic gums such as gum arabic or tragtragacanth, gum guar, methoxy cellulose or carboxymethyl cellulose to the aqueous phase before the poly alcohol sulfur solution is added to the aqueous medium.

As the medium in which the colloidal sulfur dispersion is produced, aqueous media, fats such as the cream bases employed in producing salves and ointments and mineral or vegetable oils may be used. It is an important feature of this invention, that it permits the production of stable colloidal sulfur dispersions in aqueous, fat or oil media in which the sulfur is insoluble.

In producing the dispersion the elemental sulfur is dissolved in the poly alcohol solvent while heating the mixture to a temperature within the range of from 100° to 140° C., preferably 110° to 130° C. The clear sulfur solution thus formed, which may contain up to 5% of elemental sulfur, is then poured while hot, e.g., at a temperature of about 80° C. into water or aqueous solution of natural or synthetic gums in which elemental sulfur is insoluble, whereupon the clear solution becomes a milky colloidal dispersion, or into a fat or oil vehicle. By proper selection of the sulfur solvent and the amount of water or other vehicle used, dispersions varying from the consistency of milk or thin cream to a solid cast cake can be formed when the mass has cooled. Depending on the consistency and amount of sulfur desired in the finished product, the proportion of water or aqueous solution or non-aqueous vehicle may be varied from one to ten parts by weight of sulfur solution to one to four parts by weight of vehicle.

For certain uses, such as agricultural sprays, it may be more convenient to prepare a solid sulfur solution in the poly alcohol solvent, as hereinabove disclosed. Such solid sulfur solutions can be packed and shipped as flakes or granules for addition to aqueous spray mixtures at the site of use forming a stable colloidal sulfur dispersion of sub-micron size particles in situ.

The nature of the elemental sulfur used depends primarily on the intended end use of the colloidal dispersion. For products intended for medical or veterinary use, a U.S.P. grade of precipitated, sublimed, or washed sulfur is preferred. For agricultural use and for other applications, technical grades of elemental sulfur are satisfactory.

The products prepared, as hereinabove described, may be compounded with other ingredients or packaged without further treatment for use in dermatological preparations such as salves, ointments, creams, shampoos, stick applicators, or lotions; or used in the preparation of agricultural sprays; or may be used as oxidizing agents for thiol groups in proteinaceous material and as keratolylic agents.

The following examples are given for purposes of illustrating the invention; it will be understood that the invention is not limited to these examples.

*Example I*

100 grams of propylene glycol are heated to 120° C. and 3 grams of granular elemental sulfur are added while agitating the solvent. After stirring for 10 to 15 minutes to allow the solution to come to equilibrium, any undissolved sulfur is allowed to settle out, and the clear, hot propylene glycol containing about 2% dissolved sulfur is poured into 100 ml. of a 1% aqueous solution of carboxy methyl cellulose at room temperature while agitating vigorously. A milky colloidal dispersion forms immediately containing approximately 1% sulfur in a sub-micron particle size range.

*Example II*

100 grams of glyceryl monostearate are heated to 140° C. and 6 grams of granular elemental sulfur flowers are then added during agitation. Undissolved sulfur is allowed to settle out, and the clear hot supernatant is poured into 10 ml. of water at room temperature with agitation. The solution thereupon turns into a milky colloidal dispersion which solidifies on cooling to a waxy solid containing approximately 5% of colloidal sulfur.

*Example III*

200 grams of polyethylene glycol (Carbowax 6000) is heated to 120° C. and 6 grams of granular elemental sulfur are added while agitating the hot liquid. The insoluble portion of the sulfur is allowed to settle out, and the hot, clear supernatant is treated as follows:

(a) About 103 grams while still hot are poured into 50 ml. of a 1% aqueous solution of gum acacia with agitation to form a creamy colloidal dispersion.

(b) The residual solution (about 103 grams) is allowed to cool in a mold, whereupon a solid solution of sulfur and Carbowax is formed. Some additional sulfur may precipitate and settle to the bottom of the mold during cooling. This can be scraped off when the block is removed from the mold. The solid Carbowax sulfur solution may be granulated, and subsequently dispersed in water or aqueous solutions at the time of use, to form a colloidal suspension of sulfur.

*Example IV*

100 grams of 2-methoxy ethanol (methyl Cellosolve) and 3 grams of granular elemental sulfur are added while agitating the mixture. The undissolved sulfur is allowed to settle from the clear hot solution which is then decanted into 50 ml. of a 1% solution of gum tragacanth with agitation. Agitation is continued while the mixture cools, resulting in a smooth creamed dispersion of colloidal sulfur containing between 1% and 1½% sulfur.

*Example V*

100 grams of glyceryl oleolaurate is heated to 130° C. and 5 grams of precipitated sulfur U.S.P. are added while agitating the mixture. The hot clear solution is poured into 32 ml. of water with vigorous agitation, and the milky dispersion thus formed poured in turn into 286 grams of hot petrolatum U.S.P. with vigorous agitation, forming a stable cream containing approximately 1% of colloidally dispersed sulfur.

*Example VI*

100 grams of polyoxyethylene sorbitan monolaurate is heated to 120° C. and 3 grams of granular sulfur are added while agitating the mixture. The hot clear sulfur solution is decanted from undissolved solids which are allowed to settle out, and poured into 20 ml. of 1% aqueous carboxymethyl cellulose with agitation. The resulting stable colloidal suspension contains approximately 2% sulfur.

*Example VII*

100 grams of commercial glyceryl monostearate are heated to 120° C. and 4 grams of precipitated sulfur U.S.P. are added with agitation. After allowing any undissolved sulfur to settle out, the clear supernatant solution is poured into 100 grams of commercial sodium lauryl sulfate (60% solution in water) which has been previously heated to 100° C. The mixture is stirred well while hot and allowed to cool, thus forming a stable colloidally dispersed cream containing approximately 1% of colloidal sulfur suitable for use as a shampoo base or in the preparation of medicated skin detergents.

*Example VIII*

100 grams of glyceryl monostearate and 5 grams precipitated sulfur U.S.P. are heated to 120° C. and poured into 60 ml. of liquid petrolatum U.S.P. while gently stirring the mixture. A light tan stable solid emulsion results on cooling.

It will be noted that the present invention provides processes of preparing stable suspensions of colloidal sulfur in which the sulfur particles are of sub-micron size.

It will be further noted that the present invention provides novel solutions of sulfur in the disclosed poly alcohol solvents which solutions are of relatively high concentration, say from 1% to 5% by weight and can be added to either aqueous, fat or oil vehicles to provide stable dispersions of colloidal sulfur also of relatively high concentration, say from about 1% to 5% by weight. Moreover, the present invention enables the production of stable suspensions of colloidal sulfur either as free-flowing fluids, as salves, ointments or creams, having in all forms stable particle size distribution in the submicron range and having, if desired, relatively high concentrations of colloidal sulfur.

The suspensions are free of the odor of hydrogen sulfide, are also free of ionic sulfur and have low toxicity to plant or animal tissue.

Furthermore, the present invention enables the production of a solution of elemental sulfur including solid solutions in polyethylene glycol having a molecular weight of from 1,500 to 20,000 as the solvent, which solid solutions are freely dispersible in water or aqueous solutions to form aqueous suspensions of colloidal sulfur as needed.

As many changes could be made in the above processes and many widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. The process of preparing a stable dispersion of colloidal sulfur at an elevated temperature within the range of from 100° to 140° C., which process comprises dissolving sulfur at a temperature within said range in a solvent from the group consisting of (a) aliphatic poly alcohols having from 2 to 3 hydroxy groups, containing from 2 to 1,000 carbon atoms and having all of the hydroxy groups free; (b) said alcohols in which one of the hydroxy groups is esterified by a fatty acid containing from 10 to 22 carbon atoms; (c) said alcohols in which one of the hydroxy groups is etherified, the ether radical being from the group consisting of alkyl containing not more than 2 carbon atoms, alkylhydroxy containing from 1 to 6 carbon atoms and esterified alkylhydroxy groups in which the ester portion is derived from a fatty acid containing from 10 to 22 carbon atoms and the alkyl group contains from 1 to 6 carbon atoms; (d) aliphatic poly alcohols having 3 hydroxy groups, containing from 3 to 1,000 carbon atoms in which two of the hydroxy groups are esterified by fatty acids containing from 10 to 22 carbon atoms and the third hydroxy group is free; and (e) aliphatic poly alcohols having 3 hydroxy groups, containing from 3 to 1,000 carbon atoms and in which one hydroxy group is etherified, the ether radical being from the group consisting of alkyl containing not more than 2 carbon atoms, alkylhydroxy containing from 1 to 6 carbon atoms and esterified alkylhydroxy groups in which the ester portion is derived from a fatty acid containing from 10 to 22 carbon atoms and another hydroxy group is esterified with a fatty acid containing from 10 to 22 carbon atoms the third hydroxy group being free, and adding the resultant sulfur solution to a vehicle from the group consisting of water, fat and oil in which the sulfur is insoluble but with which the solvent is freely miscible.

2. The process as defined in claim 1, in which the sulfur is dissolved to provide a solution of a concentration of from 1% to 5% by weight of sulfur, and the resultant solution while still warm is added to the vehicle.

3. The process of preparing a stable dispersion of colloidal sulfur which comprises dissolving sulfur in a polyethylene glycol having the formula

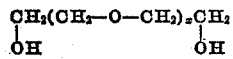

in which $x$ equals from 3 to 500 at a temperature of from 100° to 140° C. to produce a sulfur solution containing from 1% to 5% by weight of sulfur and adding the resultant solution to water to produce a stable dispersion of colloidal sulfur in water.

4. The process of producing a stable dispersion of colloidal sulfur which comprises dissolving sulfur in propylene glycol at a temperature of from 100° to 140° C. to produce a solution containing from 1% to 5% sulfur, cooling the resultant solution and adding the cooled solution while still warm to water containing carboxy methyl cellulose to produce a stable dispersion of colloidal sulfur.

5. The process of producing a stable dispersion of colloidal sulfur which comprises dissolving sulfur in glyceryl monostearate at a temperature of from 100° to 140° C. to produce a solution containing from 1% to 5% sulfur, cooling the resultant solution and adding the cooled solution while still warm to water containing carboxy methyl cellulose to produce a stable dispersion of colloidal sulfur.

6. The process of producing a stable dispersion of colloidal sulfur which comprises dissolving sulfur in polyethylene glycol having a molecular weight of from 1,500 to 20,000 at a temperature of from 100° to 140° C. to produce a solution containing from 1% to 5% sulfur, cooling the resultant solution and adding the cooled solution while still warm to water containing carboxy methyl cellulose to produce a stable dispersion of colloidal sulfur.

7. The process of producing a stable dispersion of colloidal sulfur which comprises dissolving sulfur in glyceryl oleolaurate at a temperature of from 100° to 140° C. to produce a solution containing from 1% to 5% sulfur, cooling the resultant solution and adding the cooled solution while still warm to water containing carboxy methyl cellulose to produce a stable dispersion of colloidal sulfur.

8. The process of preparing a stable dispersion of colloidal sulfur which comprises dissolving sulfur in ethylene glycol methyl ether at a temperature of from 100° to 140° C. and adding the resultant solution to water to produce a stable dispersion of colloidal sulfur.

9. The process of preparing a stable dispersion of colloidal sulfur which comprises dissolving sulfur in glyceryl oleolaurate at a temperature of from 100° to 140° C. to produce a sulfur solution containing from 1% to 5% by weight of sulfur and adding the resultant solution to water in the proportion of from 1 to 10 parts of the sulfur solution to 1 to 4 parts of water to produce a stable dispersion of colloidal sulfur.

10. The process of preparing a stable dispersion of colloidal sulfur which comprises dissolving sulfur in polyoxyethylene sorbitan monolaurate at a temperature of from 100° to 140° C. to produce a sulfur solution containing from 1% to 5% by weight of sulfur and adding the resultant solution to water in the proportion of from 1 to 10 parts of the sulfur solution to 1 to 4 parts of the water to produce a stable dispersion of colloidal sulfur.

11. The process of preparing a stable dispersion of colloidal sulfur which comprises dissolving sulfur in commercial glyceryl monostearate at a temperature of from 100° to 140° C. to produce a sulfur solution containing from 1% to 5% by weight of sulfur and adding the resultant solution to water in the proportion of from 1 to 10 parts of the sulfur solution to 1 to 4 parts of the water to produce a stable dispersion of colloidal sulfur.

12. The process of preparing a stable dispersion of colloidal sulfur which comprises dissolving sulfur in glyceryl monostearate at a temperature of from 100° to 140° C. to produce a sulfur solution containing from 1% to 5% by weight of sulfur and adding said solution to liquid petrolatum U.S.P. in the proportion of approximately 1 to 10 parts of the sulfur solution to 1 to 4 parts of the liquid petrolatum to produce a stable dispersion of colloidal sulfur in petrolatum.

13. A stable dispersion of colloidal sulfur made by adding to a vehicle selected from the group consisting of water, fat and oil, a solution of sulfur containing from 1% to 5% by weight of sulfur in a solvent from the group consisting of (a) aliphatic poly alcohols having from 2 to 3 hydroxy groups, containing from 2 to 1,000 carbon atoms and having all of the hydroxy groups free; (b) said alcohols in which one of the hydroxy groups is esterified by a fatty acid containing from 10 to 22 carbon atoms; (c) said alcohols in which one of the hydroxy groups is etherified, the ether radical being from the group consisting of alkyl containing not more than 2 carbon atoms, alkyl hydroxy in which the alkyl group contains from 1 to 6 carbon atoms and esterified alkylhydroxy groups in which the ester portion is derived from a fatty acid containing from 10 to 22 carbon atoms and the alkyl group contains from 1 to 6 carbon atoms; (d) aliphatic poly alcohols having 3 hydroxy groups containing from 3 to 1,000 carbon atoms in which two of the hydroxy groups are esterified by fatty acids containing from 10 to 22 carbon atoms and the third hydroxy group is free; and (e) aliphatic poly alcohols having 3 hydroxy groups, containing from 3 to 1,000 carbon atoms and in which one hydroxy group is etherified, the ether radical being from the group consisting of alkyl containing not more than 2 carbon atoms, alkylhydroxy in which the alkyl group containing from 1 to 6 carbon atoms and esterified alkylhydroxy groups in which the ester portion is derived from a fatty acid containing from 10 to 22 carbon atoms, another hydroxy group is esterified with a fatty acid containing from 10 to 22 carbon atoms and the third hydroxy group is free.

14. A stable dispersion of colloidal sulfur made by adding a solution of sulfur in a polyethylene glycol having the formula

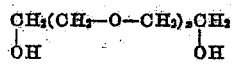

in which $x$ equals from 3 to 500 at a temperature of from 100 to 140° C. to a vehicle with which said polyethylene glycol is readily miscible and in which the sulfur becomes dispersed.

15. A stable dispersion of colloidal sulfur made by adding a solution of sulfur in propylene glycol to water at a temperature of from 100 to 140° C.

16. A stable dispersion of colloidal sulfur made by adding a solution of sulfur in glyceryl monostearate to water at a temperature of from 100 to 140° C.

References Cited in the file of this patent

UNITED STATES PATENTS

| | | |
|---|---|---|
| 1,585,058 | Volck | May 18, 1926 |
| 2,064,728 | Calcott | Dec. 15, 1936 |
| 2,201,124 | Ehman | May 14, 1940 |
| 2,390,746 | Stirn | Dec. 11, 1945 |
| 2,459,566 | Lee | Jan. 18, 1949 |

OTHER REFERENCES

Brenner, Science, vol. 119, June 25, 1954, p. 911.

Mellor's Modern Inorganic Chem., Longmans, Green and Co., 1939, page 441.

DeKay, The Bull. Amer. Cos. Hosp. Pharm., September–October 1952, p. 521.

Ser. No. 361,329, Fiedler (A.P.C.), published May 11, 1943.